United States Patent [19]

Latham

[11] Patent Number: 4,748,572
[45] Date of Patent: May 31, 1988

[54] VIDEO PROCESSOR ARCHITECTURE WITH DISTANCE SORTING CAPABILITY

[75] Inventor: Roy W. Latham, Newark, Calif.

[73] Assignee: The Singer Company, Binghamton, N.Y.

[21] Appl. No.: 678,207

[22] Filed: Dec. 5, 1984

[51] Int. Cl.[4] ............... G06F 15/40; G06F 15/626
[52] U.S. Cl. ............................... 364/518; 340/723; 340/747; 358/104; 364/522
[58] Field of Search ............... 364/518, 521, 522; 340/723, 729, 734, 747; 358/104; 434/38, 43

[56] References Cited

U.S. PATENT DOCUMENTS

| 4,475,104 | 10/1984 | Shen ................................... 340/723 |
| 4,484,187 | 11/1984 | Brown et al. ........................ 340/747 |
| 4,517,654 | 5/1985 | Carmean ............................. 364/521 |
| 4,545,765 | 10/1985 | Jarvis ................................... 358/104 |
| 4,570,233 | 2/1986 | Yan et al. ............................ 340/747 |
| 4,583,185 | 4/1986 | Heartz ................................. 364/522 |
| 4,594,673 | 6/1986 | Holly ................................... 364/522 |

Primary Examiner—Errol A. Krass
Assistant Examiner—Kevin J. Teska
Attorney, Agent, or Firm—Barry L. Haley; Douglas M. Clarkson

[57] ABSTRACT

The specification describes a way of using distance sorting in order not to require a prioritization of those polygons that are to be rendered prior to a pixel-by-pixel construction of an image. The video processor recalls the input data into the pixel processor at least a number of times equal to the number of objects to be displayed.

8 Claims, 5 Drawing Sheets

VIDEO PROCESSOR ARCHITECTURE WITH DISTANCE SORTING CAPABILITY

BACKGROUND

The present invention, generally, relates to computer-generated image systems and, more particularly, to a new and improved architecture for a video processor in such image systems.

Many flight simulators today use computer-generated image systems to provide a trainee pilot with a view out of a window of a mock cockpit. To maximize the training experience and to obtain a desired realism, such a computer-generated image system provides imagery that is in correspondence with the view observed by the pilot during an actual flight over the same terrain.

While it is still impossible in today's state of the art to build a computer-generated image system that realizes such an ideal capability as providing a view matching even closely that visible during an actual flight, nevertheless it is still possible to build such a system that provides the trainee pilot with effective training cues. In today's image systems, the following objectives are the most frequently sought after: first, a computer-generated image system should generate images that are free from anomalies or aliasing effects, so that the image does not exhibit stair-stepping, crawling, line break-up or scintillation.

Second, the image system architecture should be able to incorporate a translucency capability, so that clouds, smoke and dynamic shadowing effects can be introduced into a scene, thereby enhancing its realism. A translucency capability, moreover, provides appropriate changes in the scene content of an image so that, when the amount of detail in the scene is changed, a new image is introduced gradually and imperceptibly, instead of "popping" into view.

A third design objective is most important. The architectures of prior video processors limit their capability to process complex scene data within the time available for real-time operation. In a video processor for today's computer-generated image systems, such a limit on processing capability produces overloads, and the result is a loss of synchronism with the image display.

DISCUSSION OF THE PRIOR ART

All prior efforts at using distance sorting of data information for each pixel of a plurality of objects to be displayed have provided many more problems than they have solved. Such prior distance sorting arrangements use the distance from an assumed eyepoint to each pixel of every polygon to be displayed. The pixel distance is compared to the previously stored distance for that pixel in the image. If the newly computed pixel is closer than that previously computed, the new red, blue and green components are stored along with the new distance value for the pixel.

Alternatively, if the newly computed pixel is further away than that previously stored, the new value is discarded and the old value is retained. When every polygon has been processed, each pixel in the image will contain the color components of the object that was closest to the eye point of the viewer.

As pointed out previously, while this arrangement offers some very desirable advantages, it develops several significant problems moreso than it solves. First, the storing of distance values in addition to the color components requires an excessively large buffer memory.

Second, every pixel of every face must be computed to get its distance value from the eye point of the viewer, regardless of whether it is ultimately to be displayed or not, and this imposses a processing burden on any read-time system. Third, transparent objects are not easily accommodated, because there is only one distance value per pixel. And fourth, with only one sample point per pixel, the aliasing problems are quite severe.

Because of the above-mentioned problems, the distance sorting arrangements in the past have been avoided in situations requiring high performance. By not using a distance sorting arrangement, the database objects have had to be prioritized, and priority mathematical relationships usually require that database objects be restricted by conditions of separability and convexity. Along with these restrictions come ancillary database structures, such as, for example, separating planes or test bubbles.

The problem of geometric restrictions together with the need to manipulate ancillary structures make database software large and complex, makes databases much less flexible and generally complicates the problem of database structures. In addition to the off-line problems, real time software and hardware must retrieve the ancillary structures and execute priority mathematical relationships, tasks which complicate system organization and timing.

An arrangement in accordance with the present invention permits the use of distance sorting in order to achieve the unique advantage of not requiring a prioritization of the polygons to be rendered prior to the pixel-by-pixel construction of the image.

OBJECTS AND SUMMARY OF THE INVENTION

It is a principal object of the invention to provide a new and improved video processor for a computer-generated image system capable of producing visual images.

It is also an object of the present invention to provide a new and improved video processor for enhancing the visual data processed for a computer-generated image system.

It is another object of the invention to provide a new and improved video processor for enhancing the efficiency of distance-related data computations.

A video processor that is constructed and arranged in accordance with the present invention has a control circuit to recall the input data information into the pixel processor circuit at least a number of times equal to the maximum number of objects to be displayed within any picture element/pixel of the computed image.

THE DRAWINGS

These and other objects, features and advantages of the present invention will become clear to one normally skilled in the art, from the following detailed description and the accompanying claims when taken in conjunction with the drawings.

FIG. 4, comprised of FIG. 4A and FIG. 4B, is a flow diagram for the distance-buffered video processor circuit of the present invention.

DETAILED DESCRIPTION

One Problem

Before proceeding with a description of the circuit of the present invention, a brief description of a subpixel occlusion problem will be presented. In this context, note that occlusion problems that occur along a line of adjacent pixels are likely to be much more objectionable than those which occur entirely within a pixel.

Figure 5:
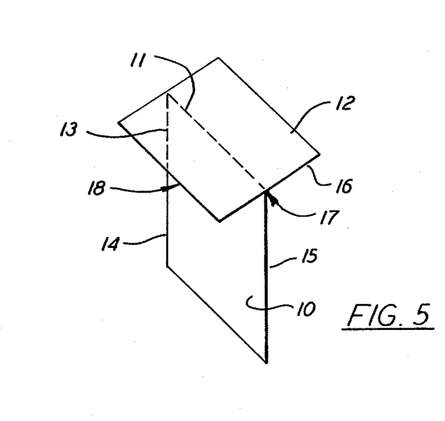
FIG. 5 is a view of two abutting faces for the purpose of aiding the description of a problem which the present invention treats.

In FIG. 5 of the drawings, a face 10 has an edge 11 that fits in abutting relationship with a second face 12. In this view, clearly, the edge 11 should be totally occluded, and this is true also for the portion 13 of a vertical edge 14.

For this to be illustrated properly on an appropriate display from a database, an edge 15 should be stopped cleanly when it touches an edge 16 at a point 17. Similarly, the edge 14 should stop cleanly at a point 18. In the prior art, this was accomplished by creating the edge 11 and the portion 13 in the database and subsequently occluding these lines or portions of lines in the circuitry.

None of the prior art arrangements perform subpixel occlusion correctly in all cases. Therefore, having subpixel occlusion errors has been tolerated in the past as being one that is less amenable to a database solution.

Figure 6:
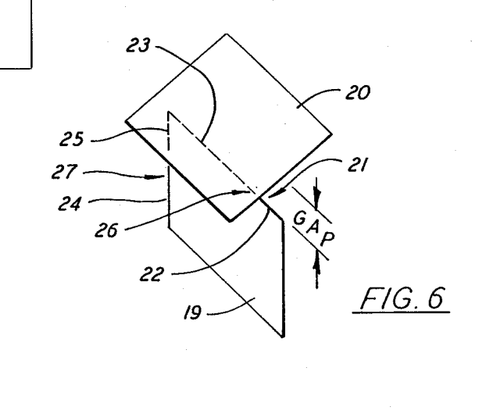
FIG. 6 is a view of two nearly abutting faces showing a gap therebetween as an aid in the description of a problem which the present invention treats.

FIG. 6 of the drawings illustrates a situation of two faces 19 and 20 being separated by a gap 21. This means that an edge portion 22 will be visible on the display while the edge portion 23 must be occluded. Similarly, an edge portion 24, positiond vertically, must be viewable while the edge portion 25 must be occluded. A problem still exists in showing the points 26 and 27 cleanly and sharply.

In the present invention, occlusion errors can only potentially occur when there is an edge within a pixel. For an occlusion error to develop, all of the following must occur: (1) there must be at least one face edge within the pixel; (2) the edge must be occluded by another face; and (3) the occluding face must have a distance point greater than the face with the occluded edge. The critical geometry involved is shown in FIG. 7 of the drawings.

Figure 7:
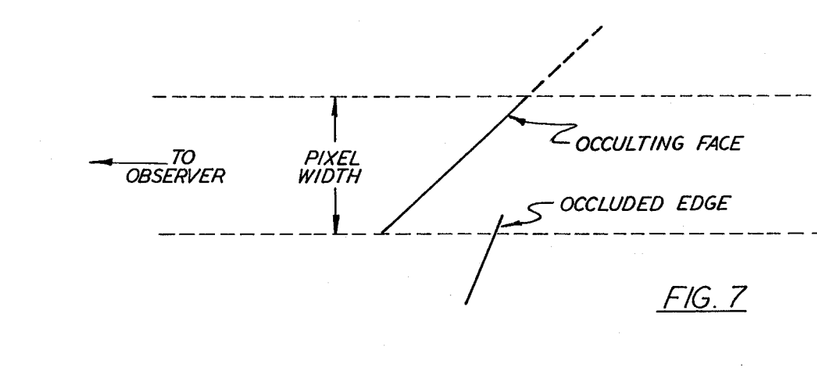
FIG. 7 is a view of geometry for nearly abutting faces as an aid in the description of a problem which the invention treats.

In FIG. 7, a top view is shown in which the faces appear as lines. The faces can be considered to be vertical walls perpendicular to the plane of the drawings. With the observer being positioned to the left of this figure as indicated, the pixel boundaries are shown by the dotted lines. This view is only general in nature, but it does illustrate the effect that an occulting face has on an occulted edge.

Figure 8:
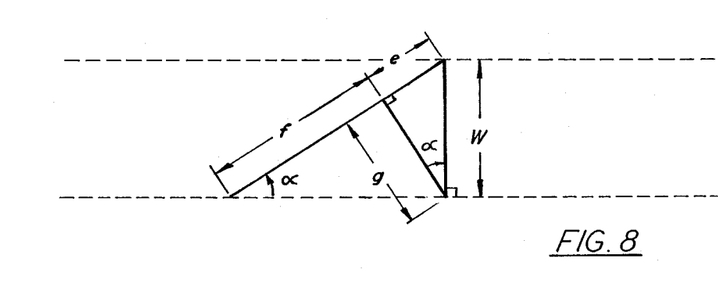
FIG. 8 is a view illustrating construction for geometric relationships as an aid in the description of a problem which the invention treats.

In FIG. 8 of the drawings, by drawing some construction lines, the conditions for an occlusion error are stated more precisely.

To determine the maximum width of the gap, g, the gap length is expressed as a fraction of the total length of the occulting faces, i.e., $g/(e+f)$ From the geometrical configurations illustrated in FIG. 8 of the drawings, the following mathematical relationships are obtained:

$$\tan a = g/f = e/g$$

$$f = g/\tan a$$

$$e = g \tan a$$

$$\frac{g}{e+f} = \frac{\tan a}{1 + \tan 2_a}$$

The ratio $g/(e+f)$ has its maximum value of $\frac{1}{2}$ when the angle is 45 degrees. The length $(e+f)$ can be at most the entire length of the occluding edge in the database. Moreover, the gap follows the locus of points of a right angle determined by lines through the ends of the segment $(e+f)$. Therefore, the gap must lie within the boundary of a half circle with $(e+f)$ its diameter.

Also, note that the geometric construction defining the problem situation requires that the gap 21, FIG. 6, be constructed perpendicular to the occluding face and that the intersection of the gap segment and the occluding face occur within the pixel. In other words, for a problem to exist, both "e" and "f" must be greater than zero simultaneously. Consequently, if the occluding face is divided into two faces at the point where the gap "g" intersects, then neither of the two new faces can have an occlusion problem.

Other Problems

There has been much effort at improving existing circuitry using today's greatly improved technology and even with the exhibition of some cleverness at the arrangement of respective component parts. Problems involving the basic buffer memory size have been made less severe by advancements recently in memory technology, and the outlook for memory technology in the near future is so greatly improved that a memory-intensive processing solution to the above outlined problem is very promising.

Even with these advancements in the technology, the problem of computing every single distance-related value for each item along a scanline to make up a scene to be viewed is tempered also by improved technology, but the problem still is not so simplified as to be trivial. The prospects offered by very large-scale integrator processors offer some hope also, but stil within the framework of existing solutions.

The problem relating to transparency, such as a scene involving fog, smoke, clouds, glass buildings, etc., has been attempted to be solved by using some of these present-day advancements in technology. However, this technology ignores the greater degree of complexity involved in the hardware and in the database, but since it is an improvement, admittedly, it is a good expedient. Nevertheless, a problem still exists involving the limited image quality due to aliasing, which, until the present invention, is unresolved.

The Invention

A video processor having component parts arranged and interconnected in accordance with the principles of the present invention offer a solution to each of the above problems, other problems and particularly this problem of anti-aliasing in a distance-buffered system. The invention, in one of its aspects, involves making several passes through the list of faces to be included in a scene. All of the pixels that are completely covered by opaque faces are determined by one pass through the list of objects, but pixels showing edges of objects will require more than one pass.

Using this principle of multiple passes, it can be determined which of the objects that intersect any part of a pixel has the least distance-value of all of the objects intersecting any part of this pixel. The contribution of the nearest object is going to be evident clearly in the final scene, and therefore, the fractional color component contribution of the nearest object is determined and stored.

Also, information about which part of an object has been covered is determined and stored also. An established mechanism for storing this data is the "bed-of-nails" of the face of the object for that pixel. For a more complete description of a "bed-of-nails" circuit (bon), reference is made to Ser. No. 394,229 filed July 1, 1982, issued Feb. 11, 1986, as U.S. Pat. No. 4,570,233, and assigned to the same Assignee as this invention.

To accomplish translucency effects within the present invention, a fraction of the nails otherwise generated for a pixel are removed. For example, one-half of the nails are removed to achieve 50% translucency. After the bed-of-nails gneration, opaque and translucent pixels are treated identically.

If there were no more than two objects contributing to any pixel, the second pass would be sufficient to finish the image, but corners of three dimensional objects will ensure the need for additional passes. The information that can be derived on the second pass, if the buffer space is restricted to a single bed-of-nails, is a distance-value for the second nearest object.

On a third pass through the list of objects, the distance-value of the second nearest object is used to trigger updating of the red, green and blue components and the bed-of-nails. Successive passes through the list of objects to be displayed occur in pairs, like the second and third, identifying and then updating successively more distant objects that may be involved in partially covered pixels.

General Theory

Figures 4, 4A:
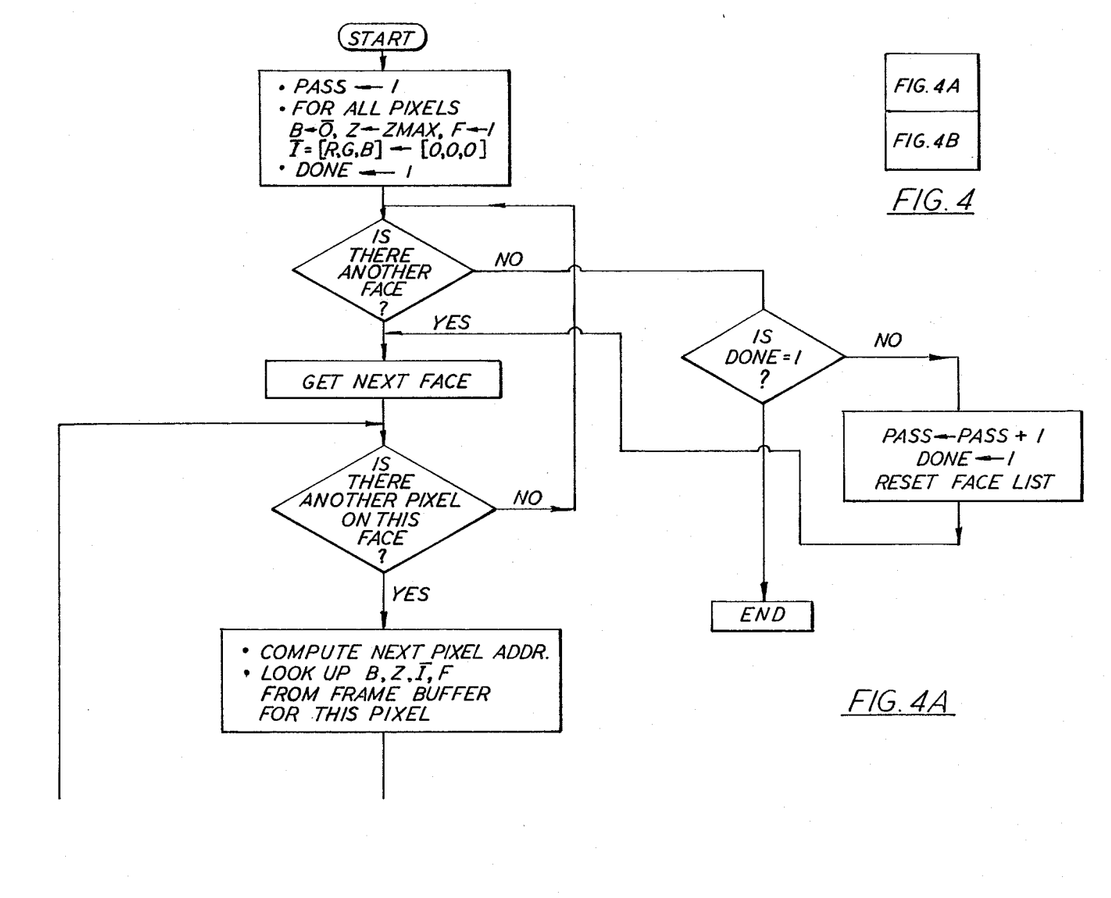
Figure 4B:
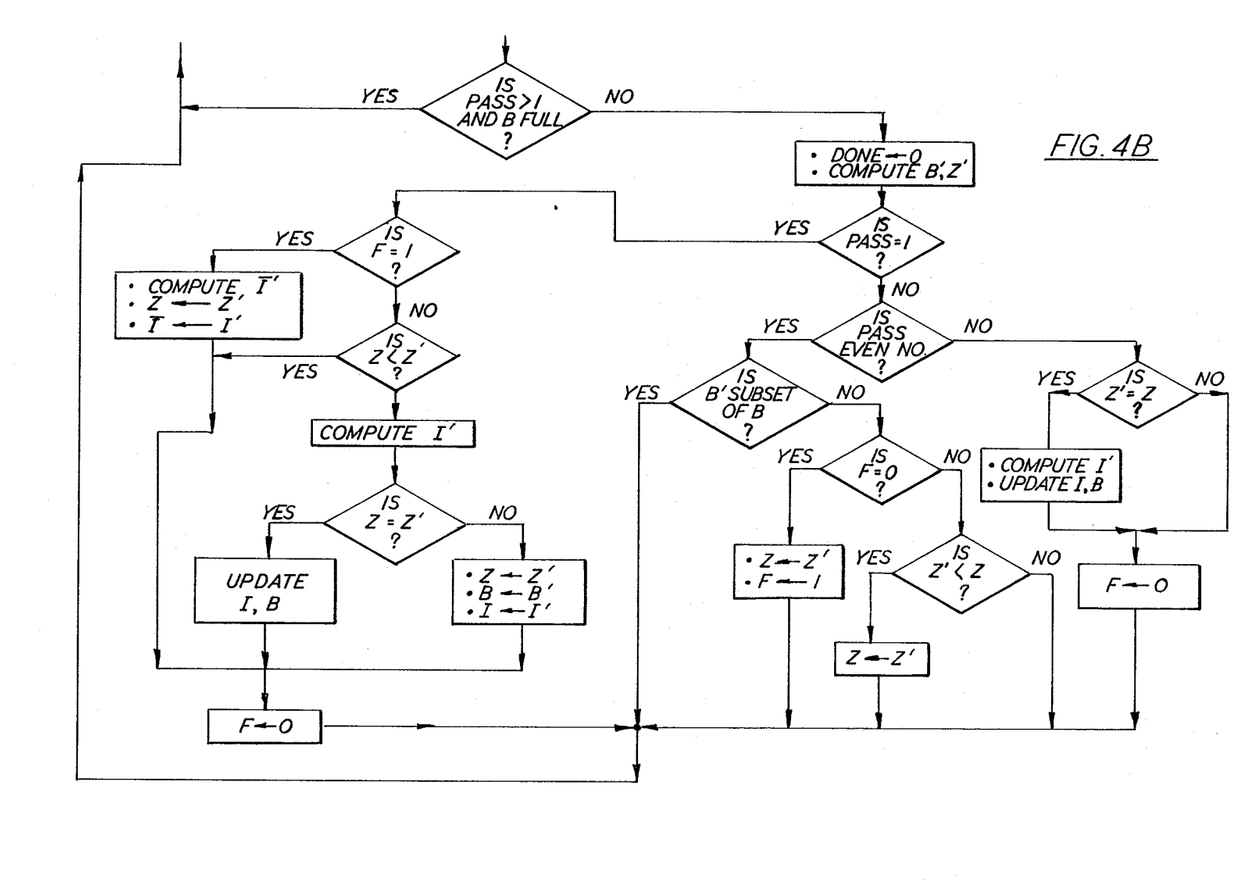

Before presenting a detailed description of the video processor circuit arrangement in accordance with the present invention, the following is a general description of its operation which is based upon, in one of its aspects, making several passes through the list of objects to be included in a particular scene. FIG. 4 of the drawings shows in flow chart format the operations of the video processor circuit of the present invention, wherein block-shaped sections represent procedures and diamond-shaped sections represent tests.

In FIG. 4, the processing operations of the distance buffered video processor are shown in flow diagram form. A frame buffer is used to store data; for each pixel in the scene storage includes "Z" (a measure of the distance to the object within the pixel); "B", a binary array representing the "bed-of-nails" for the pixel; "$\bar{I}$", the three (red, green, blue) color components of the pixel, and "F", a one bit flag associated with the pixel.

Values are computed for pixels on incoming objects, and these quantities are distinguished with a prime, as $B'$, $Z'$, $\bar{I}'$, to avoid confusion with the previously stored values in the frame buffer. Computation of the "bed-of-nails", distance, and color components for a given pixel of an object is done according to methods known in the prior art.

For example, the color component computation may include processing for smooth shading, texture, and atmospheric fading. Computation of the maximum distance (most distant point on the object) of the object within a pixel is accomplished readily also.

Update of $\bar{I}$ and B comprises determining $\bar{I}'$ and $B'$, and adding a proportionate component of the new intensity to that previously stored, according to the number of nails of $B'$, visible after the occlusion process. Testing for B "full" means checking if all the elements of the binary array are set to "1". For initialization of each pixel, all elements of B are set to zero and the B value is set to the maximum value permitted by the storage format.

The flow chart is designed to be a logical correct representation of the algorithm. However, equivalent results may be obtained with re-ordered computations and tests, and these may be done for efficient implementation in a particular hardware environment.

Referring now to the flow chart in FIG. 4, it is described more precisely as follows:
On the first pass through the list of objects:
For each pixel of each object
    Find the largest distance value of the object within the pixel
    Compute the bed-of-nails of the object for the pixel
    If there was no object previously intersecting the pixel
        Store the distance value and bed-of-nails for the pixel
        Compute and store the RGB contribution of the object
    else if there was previously an object within the pixel
    Compare the new distance with the previously stored distance
        If the old distance is less than the new distance
            Discard the new object data
        If the old distance is greater than the new distance
            Replace the old distance and bed-of-nails with the new
            Compute the new RGB and replace the old with it
        If the old distance is equal to the new distance
            Perform occlusion using the bed-of-nails to find the new contribution to RGB
            Add the new contribution to RGB
            Store the logical OR of the beds-of-nail
On the second, fourth, and succeeding even-numbered passes:
For each pixel of each object
    Examine the previously stored bed-of-nails for the pixel
    If the pixel is covered (i.e., all nails are set)
        Do nothing, skip to the next pixel
    else if the pixel is not covered
        Compute the new bed-of-nails for the pixel
        If any of the new object is not occluded Check if the pixel has received a distance value on the current pass (a flag bit can be used for this)
If no distance value has yet been received
Compute and store the current new distance value
Mark the pixel as having received a value
else if a previous distance was stored
Compare the old and new distance values, and store the lesser of the two
else if all of the contribution is occluded
Do nothing, skip to the next pixel
On the third, fifth, and succeeding odd-numbered passes:
For each pixel of each object
Examine the previously stored bed-of-nails for the pixel
If the pixel is covered
Do nothing, skip to the next pixel
else if the pixel is not covered
Compute the distance value of the current pixel
Compare the current distance to the previously stored distance
If the distance values are equal
Update the bed-of-nails and RGB
else if the distance values are not equal
Do nothing, skip to the next pixel.

The above-described flow chart uses the farthest distance value of an object within the pixel as the basis of the distance sort for the pixel. This is better than taking the distance value at a sample point because it avoids the occlusion errors that can occur whenever extrapolating distance off of the face of an object to reach a sample point, and also, it handles a special case of abutting faces of objects correctly.

With the use of the farthest distance within a pixel, the correct rendering occurs when the abutting object is on the same side of the plane it abutts as the viewer; for example, a building abutting the ground will be corerctly portrayed when viewed from above the ground.

Skip-Over Logic

The flow chart described above treats the problem of anti-aliasing and translucency, while expanding the frame buffer size moderately from the present requirements for a priority ordered system. A priority ordered system typically requires 27 bits for the color components, 16 bits for the bed-of-nails and an additional 8 bits for the transparency factor, yielding a total of 51 bits. By comparison, the present invention uses R, G and B intensities (27 bits), a bed-of-nails (16 bits), a distance value (24 bits), and a flag bit, for a total of 68 bits.

In a system with priority ordered writing, computational power is saved by having a skip-over subsystem, and in accordance with the invention, one is provided that works on the principle of a hierarchy of maximum distances, wherein the maximum distance to objects in any region of the image is determined and passed hierarchically to update the corresponding data for larger regions. If the nearest point of a new object within a region is found to be further than the previously determined maximum, the rendering of the object will be skipped over in that region.

PREFERRED EMBODIMENT

Figure 1:
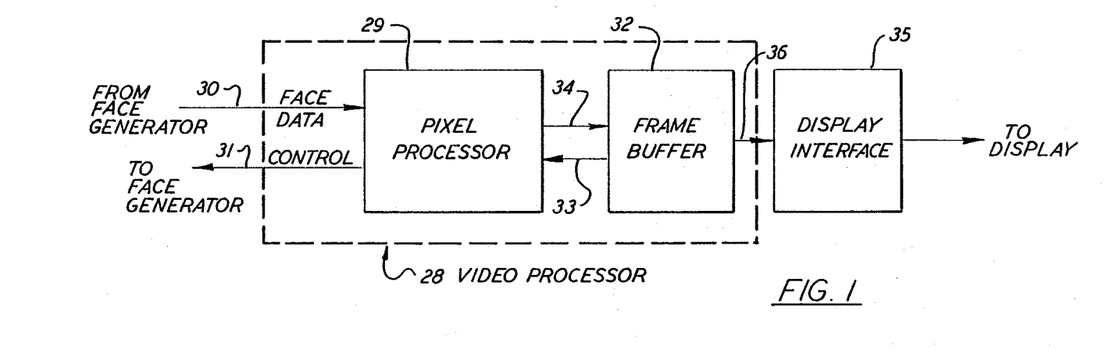
FIG. 1 is a block diagram illustrating the component parts interconnected and arranged in accordance with the present invention.

In FIG. 1 of the drawings, a video processor 28 is shown arranged in accordance with the invention. The video processor 28 includes a pixel processor 29 having an input connection from a usual object generator over a connection 30 which connects the face data for each object directly to the pixel processor 29.

In accordance with the invention, a control signal provides over a connection 31, a suitable means to interface with the object generator (not shown) by which the faces of each object to be displayed are caused to be generated for an image to be displayed. The pixel processor 29 computes and updates the data stored in a frame buffer 32 upon an initial pass through the generated faces of objects and upon at least one subsequent pass through the generated faces.

Over a connection 33, data that has been computed and stored temporarily in the frame buffer 32 by a connection 34, is recirculated back through the pixel processor 29 for more updating. Not only is this computational and updating process accomplished with the data recirculated over the connection 33, but it is also accomplished upon at least one subsequent pass through the generated faces. In an instance when an object memory circuit is connected at the input connection 30 from the object generator, it would store the object data generated on the first pass and supply data on subsequent passes also.

As each frame of data is completed, it is connected directly to a display interface 35 over a connection 36. From there it is connected directly to a suitable display (not shown).

The display interface circuit 35 is coupled to the frame buffer 32 for generating signals to drive a suitable visual display, such as a cathode ray tube display system. The data received from the frame buffer 32 by the display interface 35 is the scanned color component data.

Figure 2:
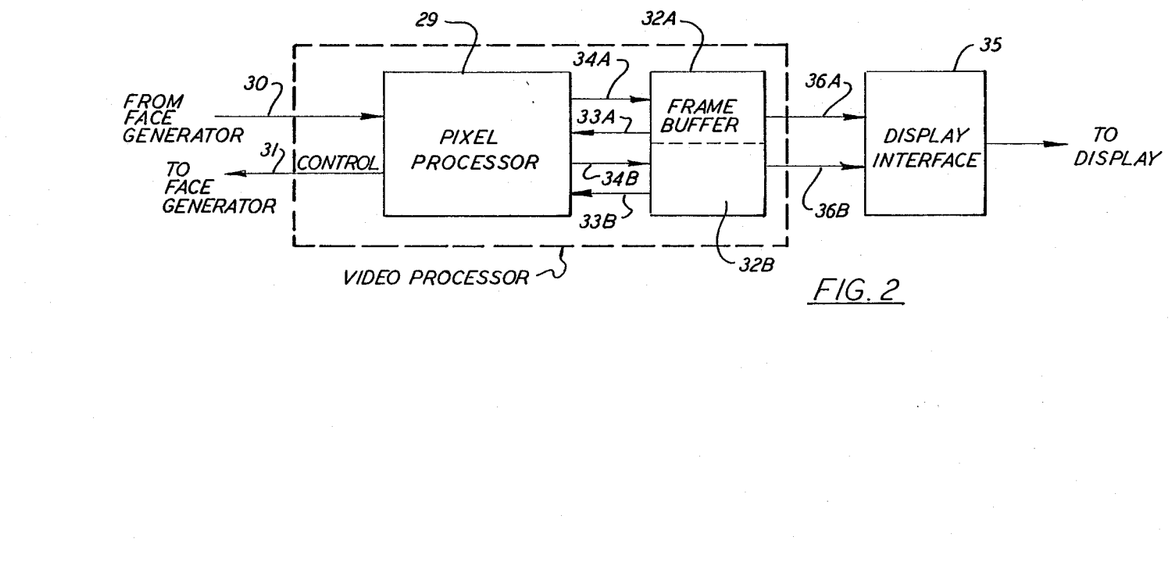
FIG. 2 is a view similar to that shown in FIG. 1, but illustrating a modification thereto.

In FIG. 2 of the drawings, a circuit similar to that shown in FIG. 1 is arranged with the same reference numerals identifying the same or comparable component parts. A major distinction between this circuit and that shown in FIG. 1 is in the arrangement of the frame buffer 32 (in FIG. 1).

In FIG. 2, the frame buffer is divided into two parts, 32A and 32B. The part 32A is connected to receive data over a connection 34A directly from the pixel processor 29 and furnishes information and data to the pixel processor 29 over a connection 33A. In like manner, the other part 32B of the frame buffer is connected to receive data over a connection 34B from the pixel processor 29 and furnishes information and data to the pixel processor 29 over a connection 33B.

There are two ways that a circuit as shown in FIG. 2 may be used, depending upon a particular need. One way is for the upper part 32A of the frame buffer being connected to receive updatable data from the pixel processor 29. In this instance, a connection 36A would be used to connect the part 32A of the frame buffer to the input side of part 32B of the frame buffer, whereupon the part 32B of the frame buffer would contain displayable data. The output from the displayable part 32B of the frame buffer would be connected directly to the display interface 35 by means of the connection 36B.

Alternatively, if still more processing speed is required, the arrangement as shown in FIG. 2 would be used in another way to treat the parts 32A and 32B of the frame buffer as totally identical parts. In this instance, alternate scanlined data may be stored in part 32A, and intermediate scanline data may be received and stored in the part 32B. This way of using the circuit of FIG. 2 is preferred.

Figure 3:
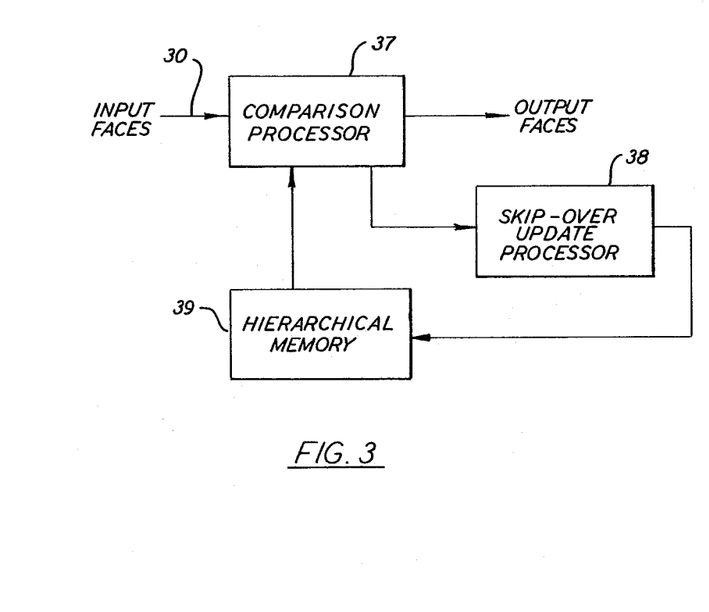
FIG. 3 is a modification to the video processor circuit arrangement shown in FIGS. 1 and 2 in accordance with the invention for improving the efficiency of distance-related data computations.

In a system with priority ordered writing, computational power is saved by having a skip-over subsystem 38, FIG. 3, that works on the principle of a hierarchy of occlusion which includes a hierarchical memory 39. However, whereas a priority-ordered system may use a hierarchy of single bit occlusion masks, distance values are now required. This works by keeping a distance value representing the maximum distance of any object in the region.

For a single pixel, the distance of the most distant point of a face of an object within the pixel is used as a basis for comparison in a processor 37. A block of pixels then can be coded with the largest of these distance values; any pixel or block not fully covered by faces of objects would have the maximum distance value permitted by this method of storage of the distance values.

A new face would be subdivided into pixel blocks according to the geometry of the hierarchy, and the newest distance value is found for the face within the block. If the nearest distance value of the new face is greater than the furthest distance value of the previous data, then the new face can have no contribution to the block and, hence, can be skipped over.

This skip-over arrangement of FIG. 3 works most effectively if the faces are presented in a priority order. It may not be too inconvenient to order the faces in approximate priority order for the sole purpose of improving the efficiency of the skip-over system.

An approximate prioritization can be obtained by sorting according to object centroid distances, for example. An error in this prioritization will have no effect on the final image, only on the processing time needed to generate it.

After the first pass, any fully covered pixel will be skipped over. Since only a relatively small fraction of the pixels have visible intersections, the skip-over logic helps substantially in speeding the processing time. However, matters can be helped still further by using an arrangement to remove some of the faces from consideration on subsequent passes.

For example, if every pixel of a face is skipped over on any pass, including the first pass, then it need not be considered on any subsequent pass.

More generally, if none of the pixels of a face lose a distance comparison on a pass, then the face can be ignored on succeeding passes. Skipped over pixels never reach the distance comparison, and the pixels that win all distance comparisons are ready to be included in the picture image. Consequently, a face that never loses a distance comparison has been rendered completely.

FIG. 3 shows a part of the video processor circuit of the present invention. Actually, the subsystem 38 of FIG. 3 fits within the pixel processor 29 adjacent the input connection 30 in FIGS. 1 and 2, as indicated by the input faces line 30.

This invention has been described in terms of a specific illustrative embodiment of a video processor circuit connected and arranged to solve problems relating to anti-aliasing, translucency and processing time. It is realized that changes can be made in implementing the invention described herein. Therefore, the following claims are intended to cover all such changes that come within the true spirit and scope of this invention.

What is claimed is:

1. In a video processor, having as input a means for generating faces of objects, comprising:
   a frame buffer means for storing distance-related data, occlusion mask data, and color component data;
   a pixel data processor means connected to the frame buffer means and having
   (i) means for receiving data from the face generating means;
   (ii) connection means interfacing from the pixel processor means back with the face generating means by which the faces of objects are caused to be generated for an image to be displayed;
   (iii) connection means interfacing from the frame buffer means back with the pixel processor means by which the data stored in the frame buffer means is computed and updated based upon an initial pass through the generated faces and upon at least one subsequent pass through the generated faces; and
   a display interface connected to the frame buffer means for receiving subsequently scanned color component data from the frame buffer means and for generating signals to drive a visual display.

2. The video processor of claim 1 wherein said pixel data processor means includes a skip-over update processor circuit means to decrease the processing time required and thereby provide a saving in computational power.

3. The video processor of claim 2 including hierarchical memory means for storing values of sequentially-encountered distance-related data.

4. The video processor of claim 3 including comparison processor means connected to said hierarchical memory means for receiving, subdividing, and comparing input face data with extreme values.

5. The video processor of claim 4 including means to connect said skip-over update processor means to the input of said hierarchical memory means and means to connect said skip-over update processor means to receive input data from said comparison processor means.

6. The video processor of claim 2 wherein said skip-over update processor circuit means includes input means to receive two dimensional extant and distance-related data for such face of said image to be displayed.

7. The video processor of claim 1 including a face memory for storing the face data generated on the first pass and for supplying data on subsequent passes.

8. The video processor of claim 7 in which the frame buffer means is divided into two parts, an updatable part and a displayable part, in which the displayable part is connected to the display interface and the updatable part is connected to the pixel processor means and in which the updatable and the displayable parts are assigned alternately on each subsequent pass.

* * * * *